(12) United States Patent
Duell et al.

(10) Patent No.: US 9,446,700 B2
(45) Date of Patent: Sep. 20, 2016

(54) ROLL OFF HOIST WITH HINGED END PORTION

(71) Applicant: The Heil Co., Chattanooga, TN (US)

(72) Inventors: Charles A. Duell, Crestline, OH (US); Richard T. Williams, Lewis Center, OH (US)

(73) Assignee: The Heil Co., Chattanooga, TN (US)

(*) Notice: Subject to any disclaimer, the term of this patent is extended or adjusted under 35 U.S.C. 154(b) by 427 days.

(21) Appl. No.: 13/911,261

(22) Filed: Jun. 6, 2013

(65) Prior Publication Data
US 2013/0272831 A1    Oct. 17, 2013

Related U.S. Application Data

(62) Division of application No. 12/476,884, filed on Jun. 2, 2009, now Pat. No. 8,465,246.

(51) Int. Cl.
*B60P 1/22* (2006.01)
*B60P 1/16* (2006.01)
*B60P 1/64* (2006.01)

(52) U.S. Cl.
CPC .. *B60P 1/16* (2013.01); *B60P 1/22* (2013.01); *B60P 1/6463* (2013.01)

(58) Field of Classification Search
CPC .................................. B60P 1/22; B60P 1/6454
USPC ........ 414/478, 480, 491, 494, 500, 538, 812
See application file for complete search history.

(56) References Cited

U.S. PATENT DOCUMENTS

| | | | |
|---|---|---|---|
| 1,570,119 A * | 1/1926 | Baxter | B60P 1/6454 414/373 |
| 2,963,185 A | 12/1960 | Jones et al. | |
| 3,130,847 A | 4/1964 | Dempster et al. | |
| 3,272,546 A | 9/1966 | Cooley | |
| 3,485,400 A | 12/1969 | Pewthers | |
| 3,786,949 A | 1/1974 | Sutton | |
| 3,858,927 A | 1/1975 | Sutton | |
| 3,874,537 A | 4/1975 | Kou | |
| 3,964,625 A | 6/1976 | Wirz | |
| 3,964,626 A * | 6/1976 | Arregui | B60P 1/6454 414/480 |
| 3,987,919 A | 10/1976 | Weeks et al. | |
| 4,026,429 A * | 5/1977 | Rumell | B60P 1/6454 414/812 |
| 4,133,439 A | 1/1979 | Goranson | |
| 4,153,169 A | 5/1979 | Cipkowski | |
| 4,204,793 A | 5/1980 | Lemaire | |
| 4,290,726 A | 9/1981 | Sutela et al. | |

(Continued)

FOREIGN PATENT DOCUMENTS

| | | | | |
|---|---|---|---|---|
| CA | 2131356 A1 | 3/1996 | | |
| DE | 804779 C * | 4/1951 | ............ | B60P 1/6454 |

(Continued)

*Primary Examiner* — James Keenan
(74) *Attorney, Agent, or Firm* — Harness, Dickey & Pierce, P.L.C.

(57) ABSTRACT

A container handling system and method for a wheeled transport vehicle is disclosed that is capable of loading and unloading containers, particularly in locations where the overhead height is limited. A hinged tail member at the rear end of the elongated body (a/k/a tilt frame member) is rotated to the ground allowing the containers to be loaded and unloaded without rotating the tilt frame to its maximum height. A cable reeving arrangement, such as a dual reeving arrangement, can be utilized to load and unload the container.

20 Claims, 8 Drawing Sheets

(56) References Cited

U.S. PATENT DOCUMENTS

| | | |
|---|---|---|
| 4,350,469 A | 9/1982 | Corompt |
| 4,645,405 A | 2/1987 | Cambiano |
| 4,802,811 A | 2/1989 | Nijenhuis |
| 4,915,567 A | 4/1990 | Ellingsen |
| 4,986,719 A | 1/1991 | Galbreath |
| 5,094,583 A | 3/1992 | Bills, Jr. et al. |
| 5,163,800 A | 11/1992 | Raisio |
| 5,192,189 A | 3/1993 | Murata et al. |
| 5,193,968 A | 3/1993 | Hicks |
| 5,203,668 A | 4/1993 | Marmur |
| 5,460,473 A | 10/1995 | LaMora et al. |
| 5,601,393 A | 2/1997 | Waldschmitt |
| 5,921,742 A | 7/1999 | Gearhart |
| 6,354,787 B1 | 3/2002 | O'Daniel |
| 6,558,104 B1 | 5/2003 | Vlaanderen et al. |
| 6,726,431 B2 | 4/2004 | Morrell |
| 6,962,473 B2 | 11/2005 | Scranton et al. |
| 7,377,592 B2 | 5/2008 | Kraenzle |
| 7,568,881 B1 | 8/2009 | Collins |
| 8,029,228 B2 | 10/2011 | Marmur |
| 2009/0110523 A1 | 4/2009 | Geoffrion et al. |
| 2009/0324374 A1 | 12/2009 | De Carli |
| 2010/0303594 A1 | 12/2010 | Duell et al. |

FOREIGN PATENT DOCUMENTS

| | | | |
|---|---|---|---|
| DE | 960962 C | * 3/1957 | ............ B60P 1/6454 |
| EP | 0564403 A1 | 10/1993 | |
| EP | 0811525 A1 | 12/1997 | |
| WO | WO-90/14250 A1 | 11/1990 | |

* cited by examiner

ROLL OFF HOIST WITH HINGED END PORTION

CROSS-REFERENCE TO RELATED APPLICATON

This application is a divisional of U.S. Ser. No. 12/476,884, filed Jun. 2, 2009. The disclosure of the above application is incorporated herein by reference.

FIELD OF THE INVENTION

This invention relates to a container handling system for a vehicle, more specifically it relates to a system and method for loading and unloading containers on and off wheeled vehicles.

BACKGROUND OF THE INVENTION

The art typically refers to systems for loading and unloading containers as "hook lift" systems and "cable hoist" systems. These systems have been extensively employed for the transport of various materials in the containers. In the usual case, the container may be loaded or unloaded upon the bed of the truck or vehicle utilizing either a hook lift system or a cable hoist system. A tilt frame member is also typically provided to assist in the loading and unloading of the containers. One typical use for such systems is in the picking up and hauling of refuse. An open top or closed top container is typically delivered to, or picked up from, a point of use with either of the systems.

In a hook lift system, the container contains a lift bar, a frame or other similar connection for engagement with a hook. When a container is full, the truck returns to the point where the container has been deposited and through the use of the hook lift system, elevates the filled container onto the truck where it may be transported, along with its contents, to a location where the container is unloaded and emptied, like a landfill or other facility. Examples of hook lift systems are found in U.S. Pat. Nos. 6,558,104; 5,601,393, 4,350,469, 3,874,537, 3,964,625, and 4,204,793.

Cable hoist systems accomplish the same loading and unloading function of the hook lift systems, but use a cable winch system like, for example, the one shown in U.S. Pat. No. 5,460,473. In this type of a system, hydraulic cylinders are typically used to move the cable about a fixed sheave attached to the vehicle hoist frame. In the fully retracted position, the cable, which is wrapped around sheaves connected to the cylinders, is at its longest affective length and can be connected to the front end of a container located on the ground. As the cylinders extend, the effective length of the cable continuously shortens as it wraps around the cylinder sheaves and then finally around the sheave attached at the front end of the hoist frame. As the effective length of the cable gets shorter, the container is pulled up and onto the vehicle, which is usually in a tilted position to facilitate loading and unloading of the container.

Another more limited and specific type of lift mechanism is found in U.S. Pat. No. 3,130,847 that uses a bail device mounted on a reciprocating carriage assembly. The bail device engages a plurality of specifically designed hook bars located and space along the underneath portion of the container. As the carriage is reciprocated back and forth along a short path at the back end of the hoist frame, the successive reciprocation causes the bail to engage the next hook bar causing the container to move forward a short distance. The reciprocation of carriage eventually pulls the container onto the hoist frame in a slow stepwise fashion.

Some tilt frames on the transport vehicles have extendable end portions which aid in loading and unloading containers in a more efficient manner. See, for example, U.S. Pat. No. 4,986,719. The distal (rear) end of the frame has a moveable portion which telescopically slides out of the frame to extend the length of the frame. These systems, although useful, have durability problems and the extendable end portions are not as strong as the tilt frame. Also, they require more floor space to load and unload containers.

Other vehicles are used to drop off and pick up relatively large metal containers, such as front loading containers, rear loading containers, air shipment containers and the like. These vehicles typically can load and transport only one container at a time and thus are inefficient if numerous containers need to be dropped off, transported and/or picked up.

One problem with these existing systems for loading and unloading containers is that they each contain only one type of mechanism to pick-up a specific type of container. For example, in the case of the hook lift systems, the vehicle can only pick up containers designed specifically to accept the hook. Likewise, the cable hoist systems can only pick up containers designed for cable based systems. Thus, companies must at a minimum maintain and operate two types of vehicles, those with hook lifts and those with cable hoists. Other container truck vehicles are limited to a specific type and size of container such as rear loading containers.

Another problem with existing tilt frame vehicle systems is that the tilt frame on the vehicle typically must be raised to a significant height for the loading and unloading of the containers and thus these systems have difficulty being used indoors or in situations where the ceiling height is low. The vehicles with extendable end portions may be used in such circumstances, but are not sufficiently durable and require more floor space for loading and unloading.

Needs therefore exist for new types of loading and unloading systems that can load, transport, and unload all types of containers, and in all types of situations and with all types of container loads, regardless of the overhead clearance.

The present invention solves these problems by providing a sliding carriage design that substantially transverses the length of the tilt frame member to allow multiple types of container and structure designs to be loaded and unloaded, and also provides a vehicle tilt frame with an end portion that is separately hinged and hydraulically actuated. The hinged end portion allows loading and unloading of containers without the necessity of raising the tilt frame to an extreme angle.

SUMMARY OF THE INVENTION

It is one object of the present invention to provide an improved system for loading and unloading containers regardless of the design of container, such as whether or not a container is designed as a hook lift or cable hoist container, or a front loading or rear loading container.

It is another object of the present invention to provide an improved system for loading and unloading containers which can be utilized for all containers, regardless of the size or type of the container, or the weight of the load and regardless of the overhead clearance height.

A further object of the present invention is to provide a system for a wheeled vehicle that allows an operator of the vehicle to service multiple types of containers without mechanical modification of the system prior to servicing the particular container design.

One particular embodiment of the invention includes a tilt frame member that is attached to the wheeled vehicle's frame. The tilt frame member has a carriage that can slide along most of the length of the body and is driven by a central hydraulic cylinder, such that when the cylinder is fully extended the carriage is positioned near the front end of the tilt frame member. By "front" or "front end" is meant a position that is generally towards the front or closest to the cab and engine of the vehicle, i.e. a position that is more towards the front than the middle. Likewise, when the cylinder is fully retracted, the carriage is positioned close to the rear or opposite end of the tilt frame member. Again, by "rear" or "rear end" is meant a position generally towards the back or rear end of the wheeled vehicle, i.e. more towards the back than the middle. One end of the central cylinder is fixed at the rear end of the tilt frame member with the other end is fixed to the carriage. The end of this cylinder that is fixed to the carriage can be the base or rod end of the cylinder. Alternatively, the central cylinder could have one end fixed to the front end of the tilt frame member and the other end to the carriage. In this configuration, when the cylinder is fully retracted the carriage is positioned at the front of the tilt frame member.

The tilt frame is pivotally connected to the vehicle chassis or frame near the rear end of the frame. One or more hydraulic cylinders are pivotally attached to a support member located on the front portion of the vehicle frame and to the tilt frame member near the front end, such that when the cylinder is fully retracted the tilt frame member is in a horizontal position parallel to and adjacent to the vehicle frame. When this cylinder begins to extend, the front end of the tilt frame member moves (tilts) upward in an arcuate path while the distal rear end moves downward. The pivot point is typically the connection between the vehicle frame and the tilt frame member located in the rear portion of the tilt frame member. Raising the front end of the tilt frame member while lowering the rear end facilitates loading and unloading of the containers. The tilt frame member may also contain a number of rollers or other friction reducing surfaces positioned along its length which also makes loading and unloading easier by reducing the friction between the container bottom and the tilt frame member.

As mentioned, the carriage is slidably connected to the tilt frame member and can move along it from front to rear along a track using bearing shoes or other friction reducing mechanisms, such as wheels or rollers. The carriage contains the means or mechanism that connects to the container, thereby allowing the container to be pulled up and onto the tilt frame member. This mechanism may be a cable hoist system or a hook lift system, or a combination of both. The cable hoist system is also known as the "cable and sheave" mechanism, while the hook lift system is also known as the "jib and hook" mechanism. If the carriage contains the jib and hook mechanism, it will also contain at least one hydraulic cylinder that is capable of moving the jib and hook mechanism through an arcuate path such that when the tilt frame member is in an elevated position, the hook can engage an A-frame, ring, trunion, lift bar, or other similar connector on the container.

Once the hook has captured or engaged the container, the cylinder(s) are extended to move the jib and hook device to its original starting point. Alternatively, depending on the orientation of these cylinders, they can be retracted to move the jib and hook device to its original starting point. The central hydraulic cylinder connected to the carriage is also operated (either retracting or extending depending on the configuration) to move the carriage from the rear of the tilt frame member to the front end and in so doing pulling the container along with it until the container is fully positioned on the tilt frame member. The cylinder(s) that elevated or tilted the tilt frame member is retracted lowering its front portion until it is in a horizontal or starting position parallel to the frame of the vehicle. It is within the scope of the invention that the hydraulic cylinders and steps mentioned above can be operated simultaneously or in any desired order. For example, the tilt frame member can be moved at the same time as the sliding carriage.

When the cable and sheave mechanism is used on the carriage, one end of the cable is fixedly attached preferably to the rear end of the tilt frame member. Alternatively, the fixed end of the cable can be attached to a cross member on the tilt frame member located in its rear portion, or attached to the central cylinder in its rear portion. The other (free) end of the cable is passed around a sheave that is fixed to the carriage. When the carriage is positioned near the rear of the tilt frame member, the free end of the cable is of sufficient length that it can be attached to a container designed to be used with a traditional cable winch system. The free end of the cable may contain a hook, latch, clasp or other suitable device to allow it to be removably connected to the container. Once the cable is connected to the container, the vehicle operator operates the central hydraulic cylinder causing the carriage to move to the front end of the tilt frame member. As the carriage moves forward so does the cable sheave which in turn reduces the length of the free end of the cable and thus pulls the container onto the tilt frame member. Because the cable is attached to the rear end of the tilt frame member and is of a fixed length, when the carriage reaches the front of the tilt frame member, the container is necessarily pulled all the way onto it. Once the carriage is positioned to the front of the tile frame member and the container is fully loaded on it, the cylinder(s) that lift the tilt frame member is retracted, lowering the tilt frame member and container to a horizontal or starting position. Again, there is no requirement that each cylinder or set of cylinders be operated in serial fashion and it is well within the scope of our invention that the cylinders and steps mentioned above may be operated simultaneously. When loading and unloading containers with the cable and sheave mechanism, it is preferable, but not necessary, that the jib and hook mechanism remain in the upright and stowed position.

In still another embodiment of the invention, the rear end of the tilt frame member is hinged so it can be rotated and pivoted independently of the rest of the tilt frame member. One or more hydraulic cylinders are provided to rotate the hinged end (a/k/a "tail portion"). With this embodiment, it is not necessary to tilt the tilt frame member to the same extent, or the conventional amount. Instead, the hinging of the tail portion can position the distal end of the tilt frame member adjacent the ground or other surface and allow the container to be loaded onto, or unloaded from, the tilt frame member and vehicle. Although a cable and sheave mechanism is preferred (either a single or dual cylinder arrangement), it is possible to use either a jib and hook mechanism or a cable and sheave mechanism for loading or unloading the containers. In addition, the hinged tail member can be designed to have the same strength as the tilt frame member.

In addition, for some types of containers, the hinged tail can be lowered for pick up and delivery of the containers without the necessity of lifting or tilting the tilt frame member.

In another embodiment, a dual cylinder reeving arrangement (rather than a single cylinder reeving arrangement as described above) can be used to operate the cable and thus load and unload the containers from or onto a vehicle with a tilt frame member.

Further features, benefits and advantages of the inventive process and system will become apparent from the following description of embodiments of the invention, particularly when viewed in combination with the accompanying drawings and appended claims.

DETAILED DESCRIPTION OF THE PREFERRED EMBODIMENTS

Figure 1:
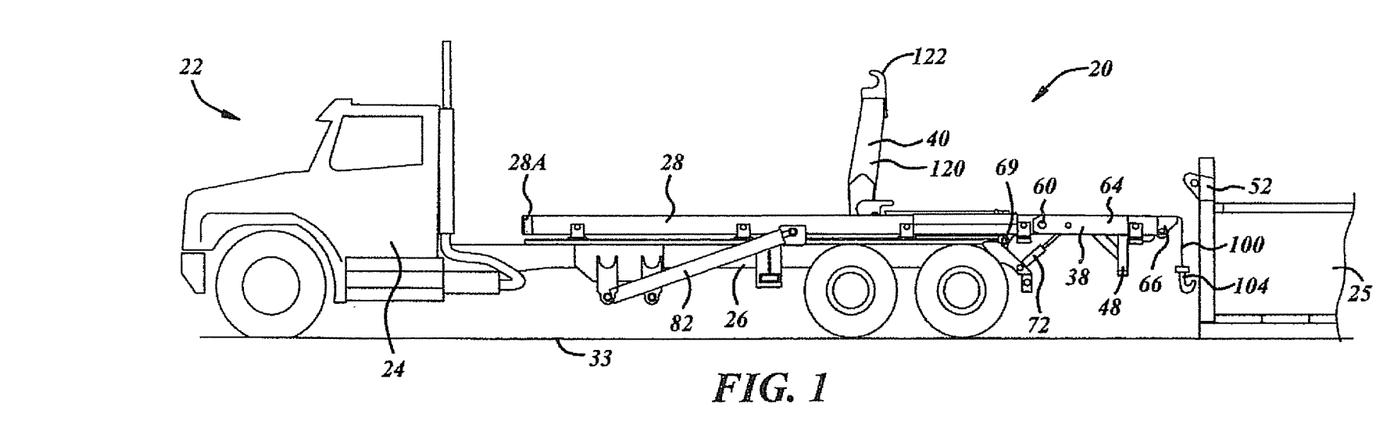
FIG. 1 is a side view of a loading and unloading system in accordance with an embodiment of the invention.

One embodiment of the present invention is shown in FIG. 1 and referred to generally by the reference numeral 20. The system 20 is adapted to be mounted on a vehicle 22 which typically consists of a cab portion 24 and a chassis or bed frame 26. The embodiment includes a tilt frame member 28, which is adapted to be pivotally mounted on the bed or frame 26 of the vehicle 22.

Figures 9, 10:
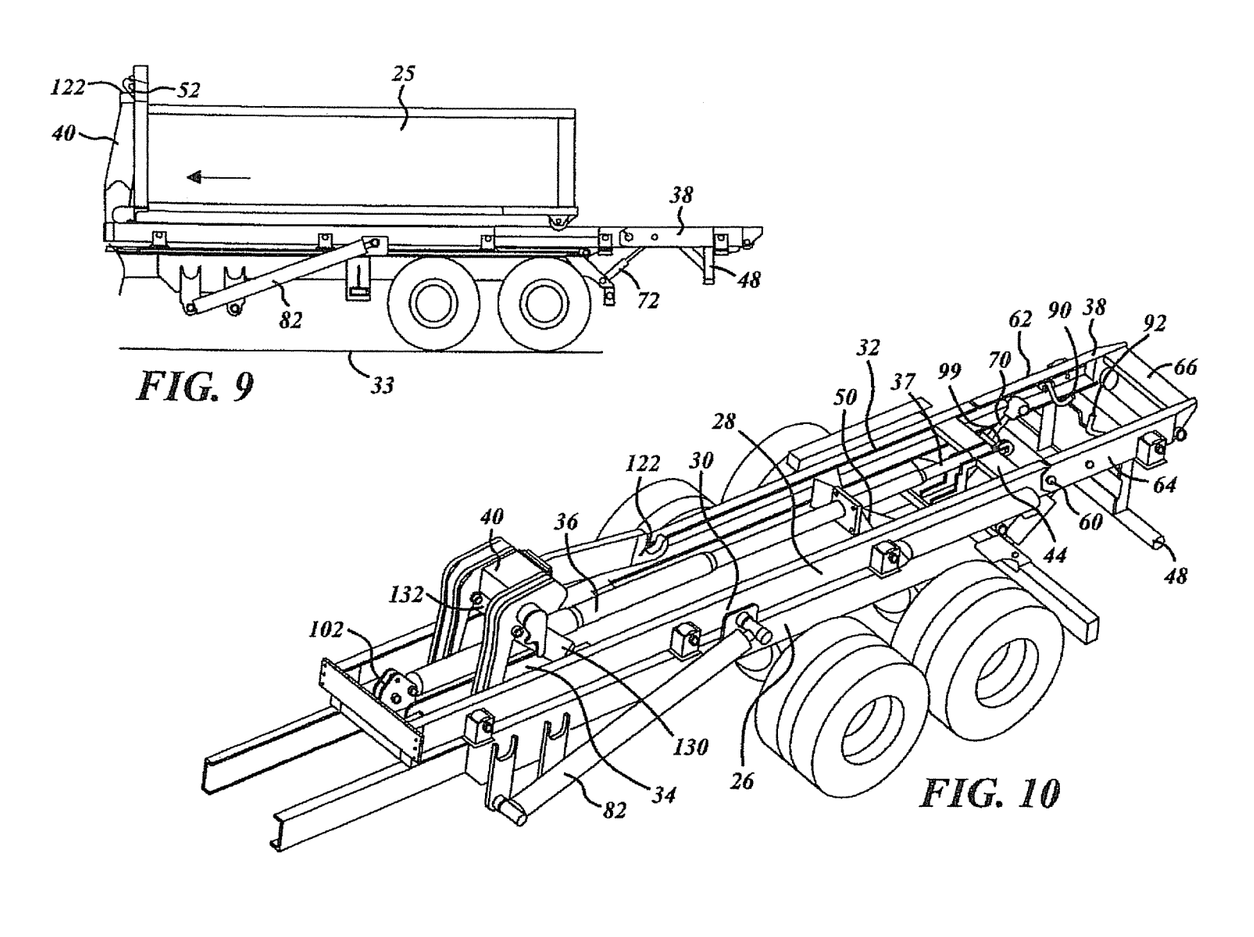
FIG. 9 is a side view of the system shown in FIGS. 6-8 showing a container fully loaded onto a vehicle.
FIG. 10 is a perspective view of an embodiment of the present invention.
Figure 11:
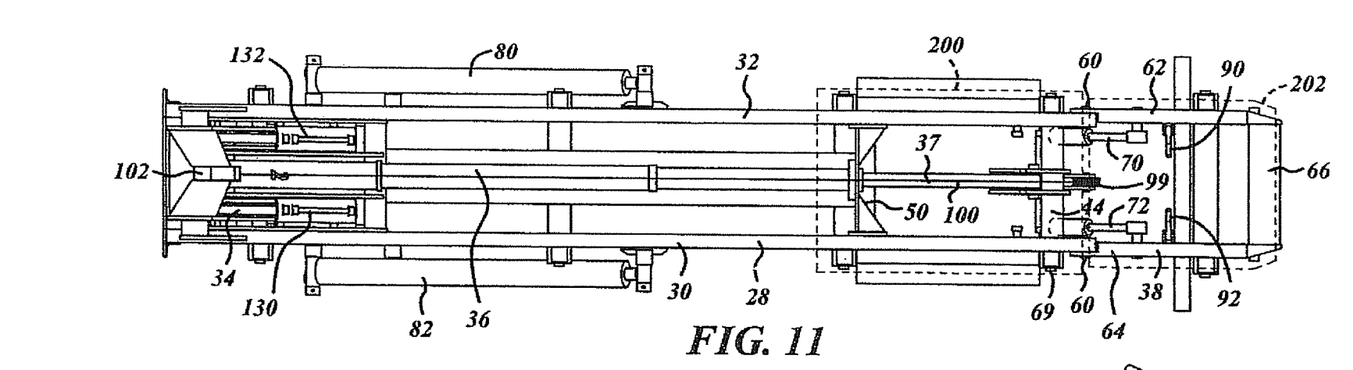
FIG. 11 is a top view of the embodiment of the invention shown in FIG. 10.

As shown in FIGS. 10 and 11, the tilt frame member 28 includes a pair of side rails 30 and 32, a slidable carriage member 34, a centrally located hydraulic cylinder 36, and a hinged tail or end member 38. The vehicles are typically used to load and unload containers, such as refuse containers, from businesses and other commercial establishments. In this regard, the use of the term "container" is not meant to be limiting. The vehicle with which the present invention can be used can load or unload virtually any structure or object known today, including cars, trucks, buses, etc.

The carriage 34 may contain one or more mechanisms that are capable of connecting to a container (generally shown by reference numeral 25) for loading and unloading purposes. In this regard, the loading and unloading system in accordance with the present invention preferably is a cable hoist mechanism. It is also possible to provide a hook lift mechanism for use in loading and unloading the containers 25. It is also possible in accordance with one embodiment of the present invention to include both a cable hoist system and a hook lift system so that multiple types of containers can be serviced by the same vehicle. In this regard, the containers 25 are typically designed either to be loaded and unloaded by a hook lift system or a cable hoist system.

Thus, although the drawings generally show both a cable hoist system and a hook lift system on the vehicle 22, it is to be noted that the present invention can be used with only one of these two systems. In this regard, at this time, it is believed that the cable hoist system will be the type of system most commonly used with the present invention.

Figure 12:
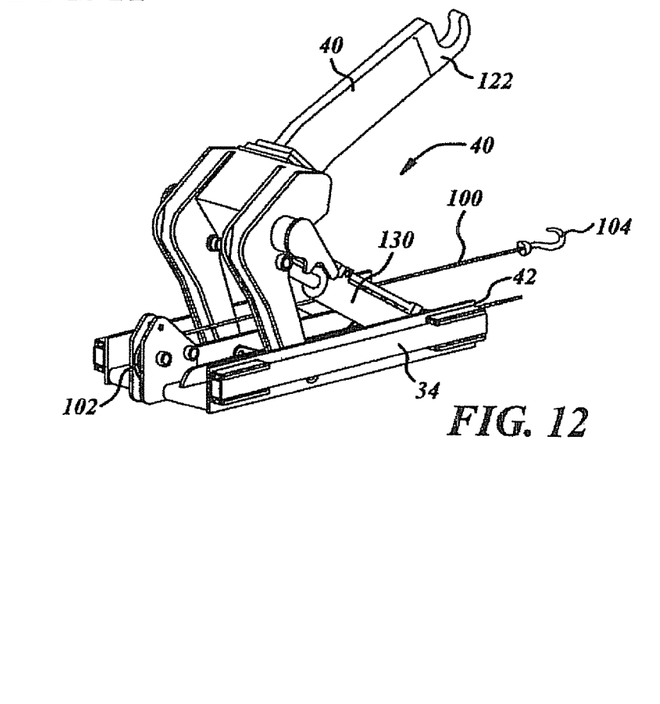
FIG. 12 is a perspective view of a representative slidable carriage device which can be used with an embodiment of the present invention.

The carriage 34 slides along the tilt frame member 26 using rollers, wheels or bearing shoes, the latter 42 being shown in FIG. 12. It is understood, of course, that any conventional type of members or system can be utilized to assist in allowing the carriage 34 to move easily along the tilt frame member 26 with a minimum of friction.

The carriage 34 is moved along the tilt frame by the action of the central hydraulic cylinder 36, which preferably is a multi-stage cylinder. As shown in FIGS. 10 and 11, the central cylinder 36 is fixed at one end to the carriage 34 and at the other end to a cross bracket 44 near the opposite end of the tilt frame member. In this manner, as the cylinder 36 retracts, the carriage 34 moves in a direction toward the rear end of the tilt frame member. At the fully retracted position of the multi-stage cylinder 36, the carriage 34 is positioned near the cross bracket member 44.

A pulley or sheave 99 is positioned on the tilt frame member where the hinged tail member rotates to accommodate the cable movement. This allows the cable 100 to easily follow along in the plane of the hinged tail member when it is rotated to its down or lowered position.

As illustrated in FIGS. 10 and 11, the multi-stage cylinder 36 is supported by a slidable cylinder support member 50 that is attached to the cylinder 36 and is designed such that it moves along the tilt frame member 28 when the cylinder 36 is extended and retracted.

Figures 16, 17:
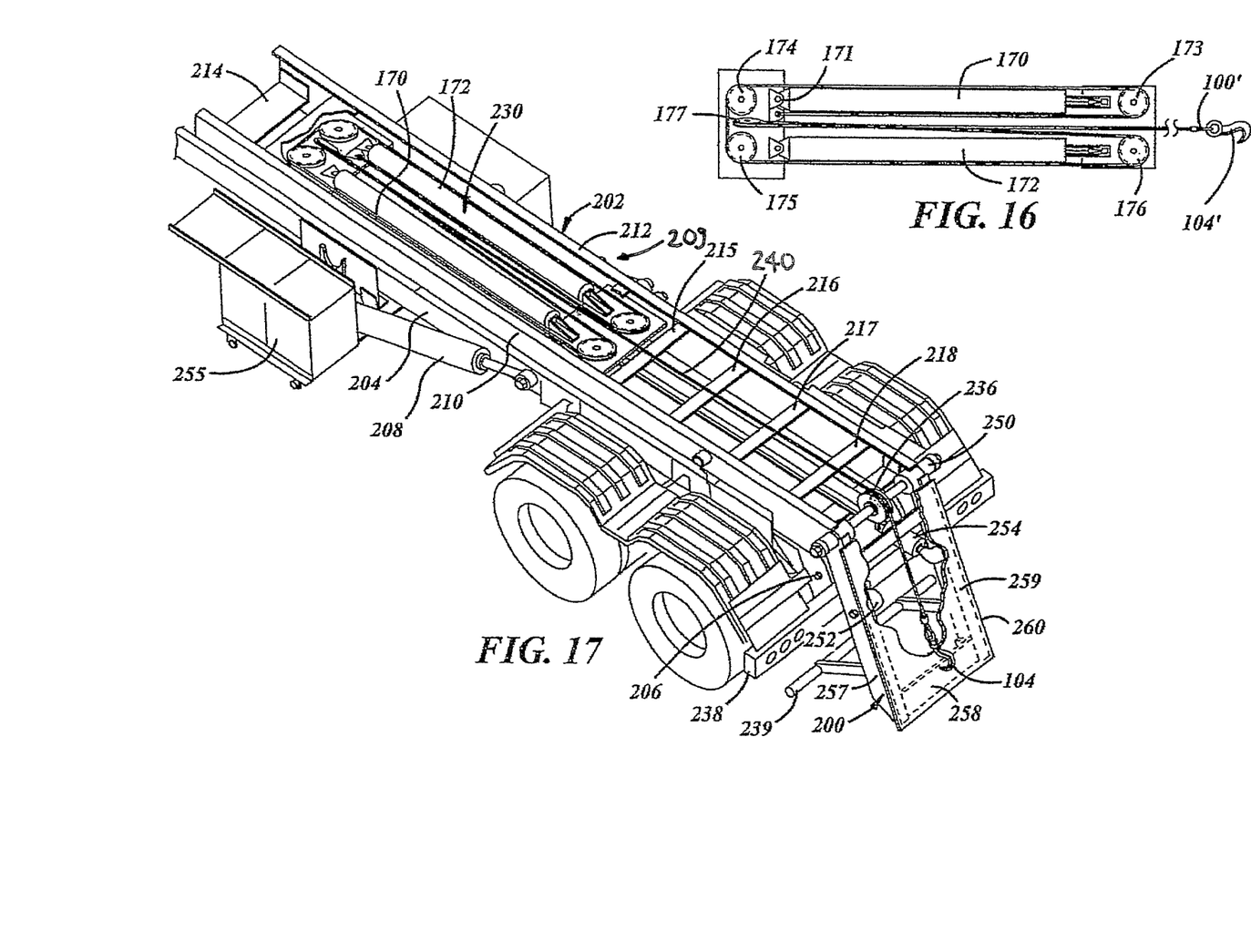
FIG. 16 depicts a dual cylinder reeving arrangement which can be used with the various embodiments of the invention.
FIG. 17 illustrates an alternate embodiment of the invention.

Although only a single hydraulic cylinder 36 is utilized to move the carriage 34 on the tilt frame member and effect use of the cable 100, it is also possible to use a dual cylinder reeving arrangement for this purpose. Such an arrangement is shown in FIG. 16. In this arrangement, two hydraulic cylinders 170, 172 are provided on the tilt frame member, each with two sheaves (one on either end). The cable 100' is affixed to a front end 171 of one of the two hydraulic cylinders and the cable is routed through pulley (sheave) members 173, 174, 175, 176, and 177 before being led out of the area of the two cylinders and into the position to be used to raise or lower a container.

Once the carriage 34 is positioned near the rear of the tilt frame member 28, the operator uses the cable hoist system or the hook lift system to engage the container 25. As indicated above, the particular engaging mechanism will depend on the specific design of the container 25. If the container has a lift bar 52, as shown in FIG. 1, and is designed only to be engaged by a hook lift type mechanism, then a tilt frame 28 with a jib and hook mechanism needs to be utilized. This is described in more detail below with reference to FIGS. 6-9.

With any of the loading and unloading systems, the present invention utilizes a hinged end member (a/k/a tail member) 38. The tail member 38 is rotatably connected to the rear ends of the side rail members 30 and 32 on the tilt frame member 28. A pair of pivot members 60 are used to rotatably attach the tail member 38 to the end of the tilt frame member 28.

The hinged tail member 38 includes a pair of side rail members 62 and 64 as well as a rear end cross brace member 66.

A pair of hydraulic cylinders 70 and 72 are used to rotate the hinged tail member 38. The hydraulic cylinders 70 and 72 are attached at one end to the tilt frame member 28 and attached at the other end to the hinged tail member 38.

As shown in the drawings, the hydraulic cylinders 70 and 72 allow the tail member 38 to be moved from a position in alignment with the tilt frame member 28 to a position where the end cross brace member 66 is positioned on the ground or other surface 33 on which the vehicle is positioned. In the latter position, the hinged tail member can act as a stabilizer to prevent heavy loads from lifting the front of the vehicle when they are being loaded and unloaded.

The tilt frame member 28 is pivotally attached to the bed or frame 26 of the vehicle 22 in a conventional manner. The pivot mechanism is generally referred to by the reference number 69. A pair of hydraulic cylinders 80 and 82 are used to rotate (tilt) the tilt frame member 28 relative to the bed or frame 26 in a manner shown in the drawings. In this regard, the tilting of the tilt frame member 28 is conventional with container vehicles of this type and it is not believed necessary to describe the tilting and pivoting mechanism in further detail herein.

As indicated above, the present invention is preferably utilized with a cable hoist system. In this system, one end of the cable 100, as shown in FIGS. 1-5, is fixedly attached to the tilt frame member 28. In the embodiment shown in FIGS. 1-5, the fixed end of the cable 100 is securely attached to the cross brace member 44. Alternately, the fixed end of the cable can be attached to another cross member on the tilt frame member located in the rear portion of the tilt frame member 28, or attached to the central cylinder in the rear portion of the tilt frame member.

The other free end of the cable 100 is passed around a sheave or pulley member 102 that is fixed to the carriage 34, as shown in FIGS. 10 and 11. When the carriage 34 is positioned near the rear of the tilt frame member 28, the free end of the cable 100 is of sufficient length that can be attached to a container designed to be used with a traditional cable winch system.

The free end of the cable 100 may contain a hook, latch, or clasp, such as hook 104 shown in FIGS. 1-5 and 12 to allow it to be removably connected to the container.

Figure 2:
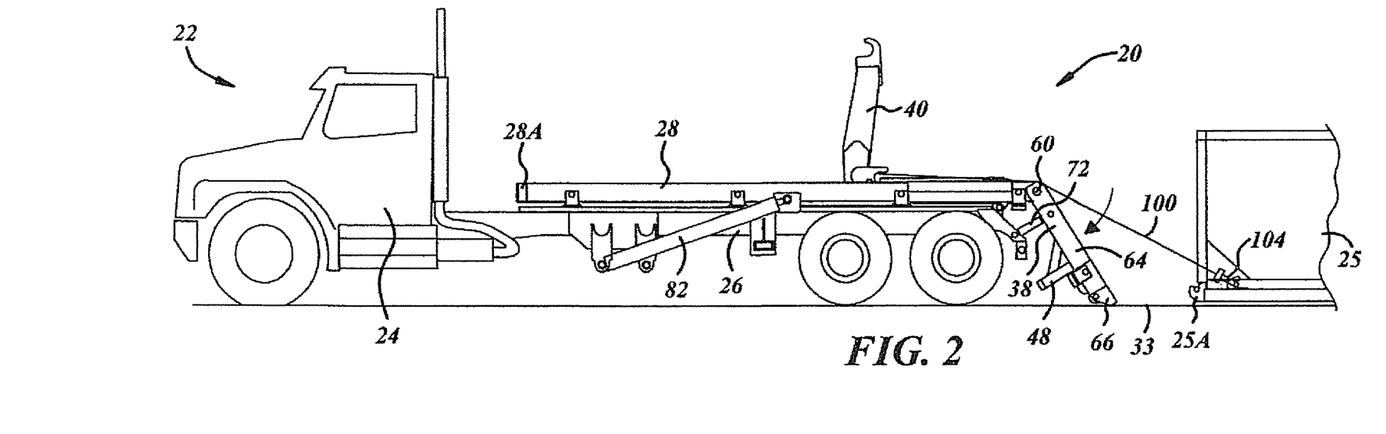
FIG. 2 is a side view of the system shown in FIG. 1 illustrating use of a cable hoist system.

Once the cable 100 is attached to container 25, as shown in FIG. 2, the vehicle operator operates the central hydraulic cylinder member 36, causing the carriage 34 to move toward the front end of the vehicle. In this regard, FIG. 2 illustrates the beginning of a loading operation. As shown, the hinged tail member 38 has been rotated until the end member 66 is positioned on or near the ground or other surface 33. In addition, the hook or other attaching mechanism 104 has been attached to the container 25. Note that the operator can in some situations raise the containers onto the hinged tail without raising (tilting) the tilt frame member and with skill continue to load the containers all the way onto the tilt frame member.

In the latter situations, it also is possible for a hinged tail member to be utilized on a container transport vehicle without a tilt frame member. Instead, a fixed elongated body member can be positioned on the bed or vehicle frame 26. The hinged tail member then is attached to the end, or near the end of the elongated body member. Also, rails, tracks or the like are preferably positioned on the elongated body member to assist in sliding containers along its surface and/or to assist in holding the containers in place.

Figure 3:
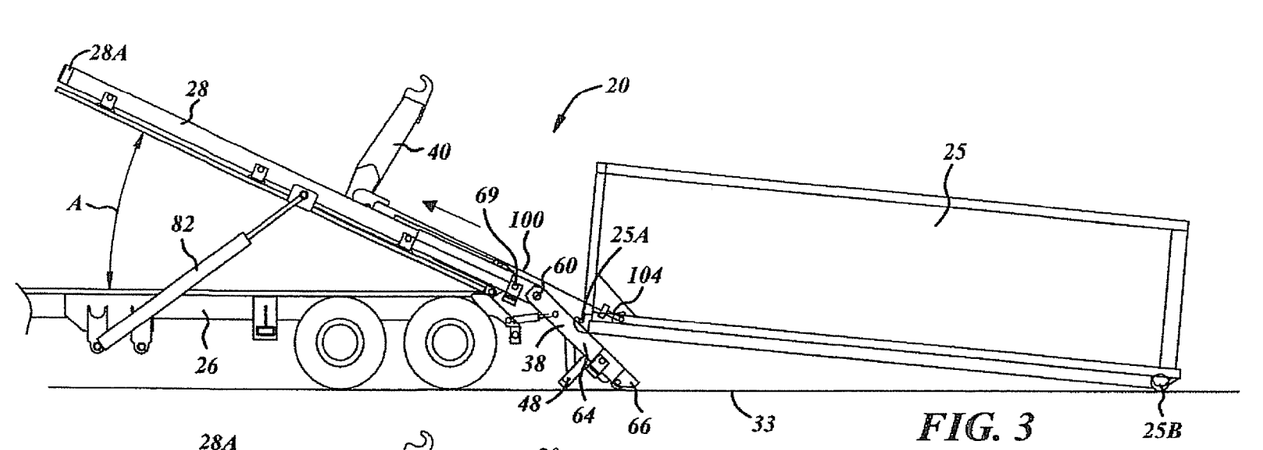
FIGS. 3 and 4 are additional side views of the system shown in FIGS. 1 and 2, illustrating a container being loaded onto a vehicle.

FIG. 3 illustrates another step in the operation of loading the container 25 onto a vehicle. In this Figure, the tilt frame member 28 has been raised or tilted by activation of the hydraulic cylinders 80 and 82 and the front corner or end 25A of the container 25 has been pulled up onto the hinged tail member 38. The rotation or tilting of the tilt frame member 28 is illustrated by the angle A in FIGS. 3 and 4. With the present invention, the amount of angle A is discretionary with the operator.

Figure 4:
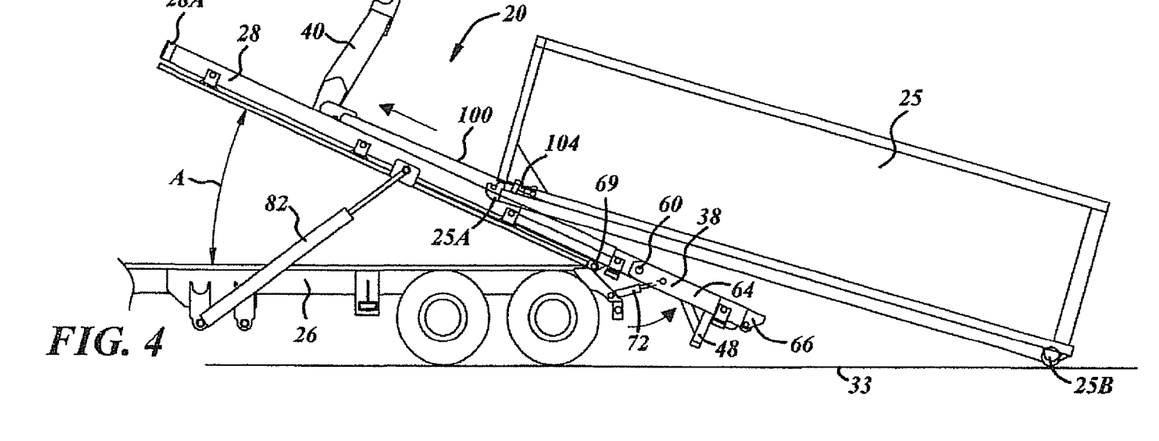

As the carriage 34 moves forward towards the cab 24 of the vehicle 22, the cable sheave 102 moves with it. This in turn reduces the length of the free end of the cable 100 and thus pulls the container onto the tilt frame member (or elongated body member). Because the cable 100 is attached near the rear end of the body and is of a fixed length, when the carriage 34 reaches the front of the tilt frame member, the container is necessarily pulled all the way onto it. In this regard, a further intermediate step in the loading of a container 25 is shown in FIG. 4.

Figure 5:
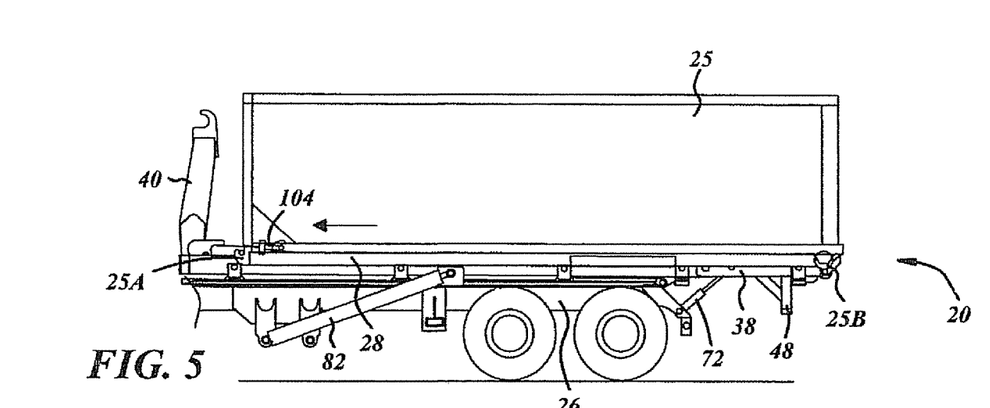
FIG. 5 is a side view showing a container fully loaded on a vehicle.

Once the carriage 34 is positioned at the front of the tilt frame member, the container is fully positioned on it. This is shown in FIG. 5. At this time, or shortly before, the hydraulic cylinders 80 and 82 are activated lowering the tilt frame member 28 until it rests horizontally on the bed or frame 26 of the vehicle. Also, the hydraulic cylinders 70 and 72 are activated which rotates the hinged tail member 38 back to its position in alignment with the tilt frame member 28.

The precise sequence of operation of the tilting of the tilt frame member, the movement of the carriage 34 along the tilt frame member, and the return of the hinged tail member to its rest position, is not critical. There is no requirement that each cylinder or set of cylinders be operated in a serial fashion and it is well within the scope of the invention that the cylinders be operated simultaneously, or in any other manner which is convenient to the operator.

In this regard, if a jib and hook member 40 is also provided on the slidable carriage member 34, then it is simply moved along the tilt frame member with the carriage member 34 as shown in FIGS. 1-5.

For ease in loading and unloading containers, such as container 25, on and off the tilt frame member 28, it is typical for the container to have rollers or slides in the forward end 25A of the containers, as well as rollers or slides in the rear end 25B. Devices of this type are shown, for example, in FIGS. 1-4. It is also typical to include side rails, tracks or guide rails of some type on the tilt frame member. The precise devices for these purposes are not part of the present invention and any conventional type of devices known in the art for these purposes can be utilized.

The weight distribution of the loaded vehicle is important from legal and safety standpoints. Because the carriage 34 can be moved along the tilt frame 26, the present invention has the ability to position a loaded container anywhere along its length, thus distributing the load in the most efficient manner. The container may be positioned either forward or adjacent the cab 24 as shown in FIG. 5 or, for example, if a smaller container is utilized, it can be positioned further towards the rear of the vehicle. The movement of the carriage 34 is controlled by the extension and retraction of the multistage cylinder 36.

The present invention is particularly useful for loading and unloading containers where there is a low ceiling or type of obstruction which prevents the tilt frame member from being rotated or tilted to an extent necessary to load or unload a container without a hinged tail member. With conventional vehicles with tilt frame mechanisms, the tilt frame members is typically rotated from the bed or frame of the vehicle until the rear end of the tilt frame is positioned on the ground. In order to accomplish this, the hydraulic cylinders conventionally rotate the tilt frame up to an angle A of approximately 40-50°. Conventional fixed length tilt frame members in use today are on the order of 22-24 feet in length. In this manner, the forward end 28A of the tilt frame member 28 can be tilted to a position well above the height of the cab of the vehicle. When unloading a container with a conventional tilt frame mechanism, the tilt frame member is rotated in a similar manner to a similar angle. With the present invention, it is possible to maintain the angle A for both loading and unloading containers and thus the angle of the tilt frame members, to approximately 0-20°.

When the telescopic cylinder 36 is retracted, the carriage will push the container rearwardly. At a point where the center of gravity of the container is adjacent the hinged tail member or positioned on it, the leading edge of the container will meet the ground. The vehicle may then pull forward extending the length of the cable to the length where the vehicle may pull out from underneath the raised container. The container will then roll further off the vehicle and down the hinged tail member.

As indicated above, either a cable hoist system or a hook rail system, or both, can be utilized with embodiments of the present invention. Thus, it is possible to provide an elongated body with a carriage member 34 having only a cable and sheave mechanism. It is also possible to provide a carriage 34 with only a jib and hook mechanism. In another embodiment, it is possible to provide the tilt frame member 28 with both a cable hoist system and a hook rail system.

Figure 6:
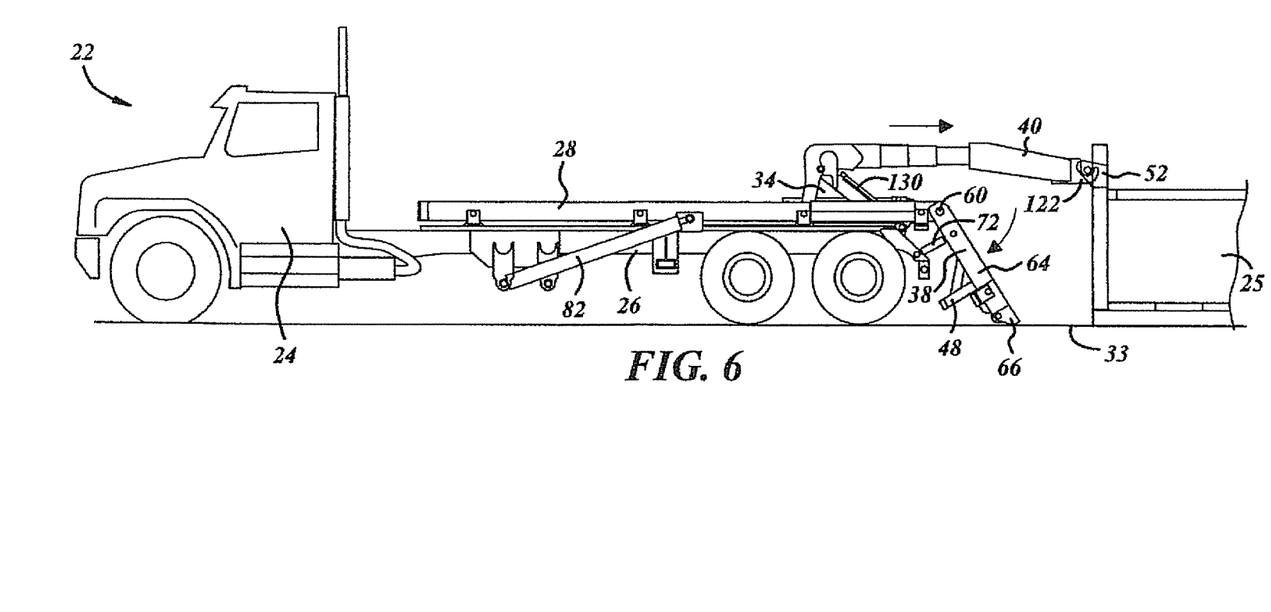
FIG. 6 is a side view of a loading and unloading system in accordance with an embodiment of the invention illustrating use of a jib and hook mechanism to load a container on a vehicle.

The use of a hook rail system in accordance with an embodiment of the present invention is shown in FIGS. 6-9 of the drawings. In this embodiment, the jib member 40 is extendible preferably in a telescopic manner, as shown in FIG. 6. This allows the hook member 122 on the end of the jib 40 to extend beyond the end of the tilt frame member and be connected to the container 25 when the container is positioned on the ground 33. In this regard, as shown in FIGS. 10-12, the jib member 40 is activated by a pair of hydraulic cylinders 130 and 132 in order to raise and lower the jib member 40 with the hook 122 at the end thereof. Movement of the vehicle can assist in loading and unloading the containers.

The cylinders 130, 132 on the carriage 34 are activated to raise or rotate the jib to the position shown in the drawings. In this regard, in the position shown in FIG. 6 where the jib is extended, the hook member 122 on the end of the jib 40 can be engaged on the lift bar 52 on the container 25. The container 25 then can be elevated and lifted onto the tilt frame member in a manner similar to that described above with reference to FIGS. 1-5.

Figure 7:
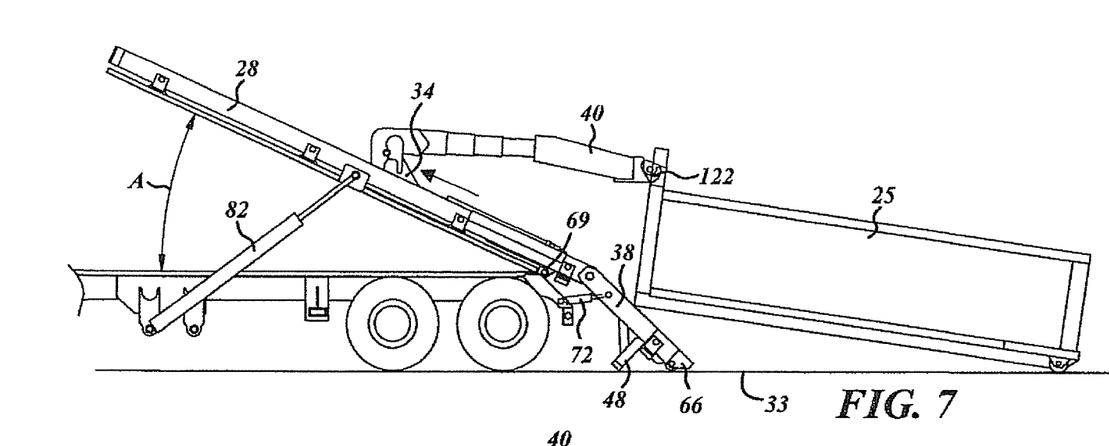
FIGS. 7 and 8 are side views of the system shown in FIG. 6 illustrating a container being loaded onto a vehicle.
Figure 8:
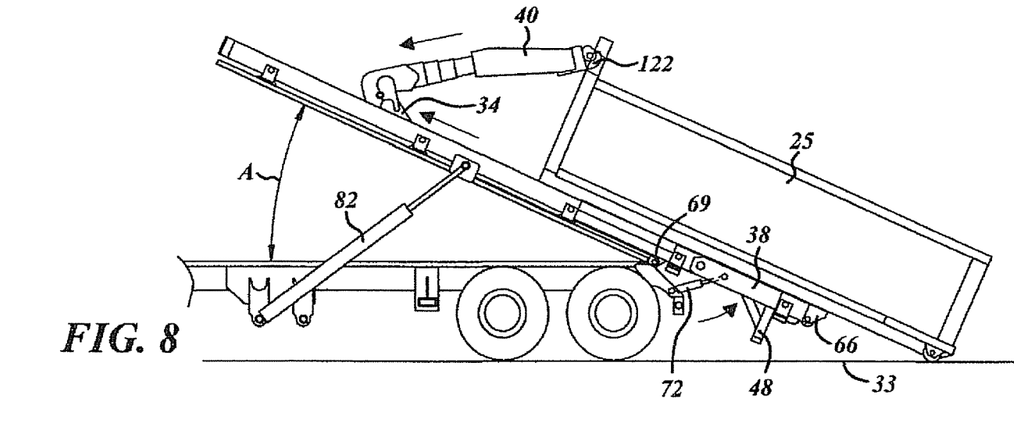

In this regard, as shown sequentially in FIGS. 6, 7, 8, and 9, the hinged tail member 38 is first lowered as shown in FIG. 6 and the carriage 34 is started to move toward the front end of the vehicle which pulls the container 25 onto the rails of the hinged tail member and onto the surface of the tilt frame member 28. At some point, the cylinders 80 and 82 are activated in order to tilt the tilt frame member 28 to the angle A as shown in FIGS. 7 and 8 and the hinged tail member 38 is returned to its rest position, as shown in FIG. 8.

When a multistage cylinder 36 is fully extended, the slidable carriage 34 is at its most forward position on the tilt frame member 28. At this point, the container 25 will be fully positioned on the vehicle, as shown in FIG. 9. As indicated, the container 25 can be positioned at any desired location on the tilt frame member, although the weight distribution of the loaded vehicle is important from a legal and safety standpoint. Also, again the position of the container 25 is determined by the position of the carriage 34 which in turn is positioned by the extension and retraction of the multistage cylinder 36.

As with the cable hoist system, there is no requirement that each cylinder or set of cylinders utilized with the hook lift system be operated in a serial fashion. The sequence of activation is dependent upon the discretion of the operator, as is well known in the art.

The side rail members 62 and 64 on the hinged tail member 38 allow use of L-shaped locking members 90, 92 thereon. The locking members are positioned on the inside of the rail members 62, 64 as shown in FIGS. 10 and 11 and are used to secure a container 25 to the tilt frame member 28 once the container is loaded onto it. (In an alternate embodiment, the locking members can be positioned on the outside of the rail members 62 and 64.) The locking members are pivotally attached to the rail members and are hydraulically actuated. The locking members hook over the lower tubular members, or the lower flanges on the I-beams or L-shaped beams, which are positioned on the bottom of the containers.

The locking members are called "hold-down" devices. Having them positioned on the hinged tail member minimizes or eliminates the problem with conventional container loading/unloading vehicles because of the steep lifting angle with conventional devices. The locking members provide greater reliability and safety.

Another benefit of the invention is the ability to dislodge the contents of the container 25 using the central cylinder 36. In some situations, the container is loaded with material that becomes lodged in the container after loading and transportation to a dump site. In these circumstances, merely tilting the tilt frame member to elevate the front end of the container will not be sufficient to cause the contents to fall out of the rear end of the container into the dump site. Indeed, the customary method to empty a container using existing systems is limited to raising the tilt frame member to the predetermined dump angle and then moving the vehicle in reverse and having the driver repeatedly apply the vehicles brakes rapidly to cause a rapid deceleration. Unfortunately, this prior method of emptying containers causes excessive wear on the vehicle and lifting system resulting in damaged parts and increased frequency of maintenance, especially to the vehicle's drive line and rear end differential.

The design of the central cylinder 36 avoids these problems and provides an improved and safer method of emptying lodged loads from a container. Loads that are difficult to empty from open top containers include sludge materials, frozen granular materials and construction debris which may bridge across the container width. In the case of closed top containers, these are commonly used to receive material from a compaction device. Loaded materials are densified as a result of the compaction forces exerted; thus the newly densified material in the closed container often have great expansion forces which can "lock" the material into the container. Freezing winter conditions greatly magnify this effect. Because the traditional method of backing up and rapid braking does not dislodge the contents, it becomes necessary to dig out the container with a mechanical device, such as a back-hoe or similar device, which takes time, costs money and ties up equipment. Further, the vehicle and loaded container must leave the unloading area to go to a safe solid footing area before this alternative emptying method can be performed.

The centrally loaded multi-stage cylinder 36 allows a rapid moving of only the container, and not the vehicle or the elongated body, while the container is in a tilted position on the tilt frame member. The front end 28A of the tilt frame member 28 is elevated to a predetermined dump angle by extending the cylinders 80 and 82. Carriage 34, which is slidably connected to the tilt frame member 28 and indirectly connected to container 25 through an engaging system, can move forward and backwards along the elongated body by actuating central cylinder 36. Repeated movement of the container 25 back and forth along the dump angle of the tilt frame member 28 using movement of carriage 34 creates a shaking action similar to shaking salt out of a salt shaker. This shaking action is only possible because of the design of the central cylinder where the smallest diameter stage 37 (see FIGS. 10 and 11) of multi-stage hydraulic cylinder 36 is the first stage to retract when the multi-stage cylinder is fully extended. Rapid movement of the cylinder 36 will result with the system hydraulic fluid flowing through the smallest diameter section 37 of the multi-stage cylinder 36. The shaking motion is most effective when the engaging system is a cable hoist mechanism because when the carriage 34 retracts, two feet of cable 100 will be released per foot of travel of the carriage, thus further intensifying the shaking action. This occurs because cable sheave 102 is attached to carriage 34 and moves with the carriage and the fixed length cable 100 moves across sheave 102.

Also, in accordance with the preferred embodiment of the present invention, the hinged tail member 38 has a bumper device 48 attached to it. The device 48 meets the rear hold down device requirements of the U.S. Department of Transportation ("DOT"). Often, the required hold-down devices are "in the way" when loading containers and often get damaged as a result. Having the hold-down device 48 attached to the hinged tail minimizes or eliminates this problem with conventional container loading/unloading vehicles, and also provides greater reliability and safety.

Figure 13:
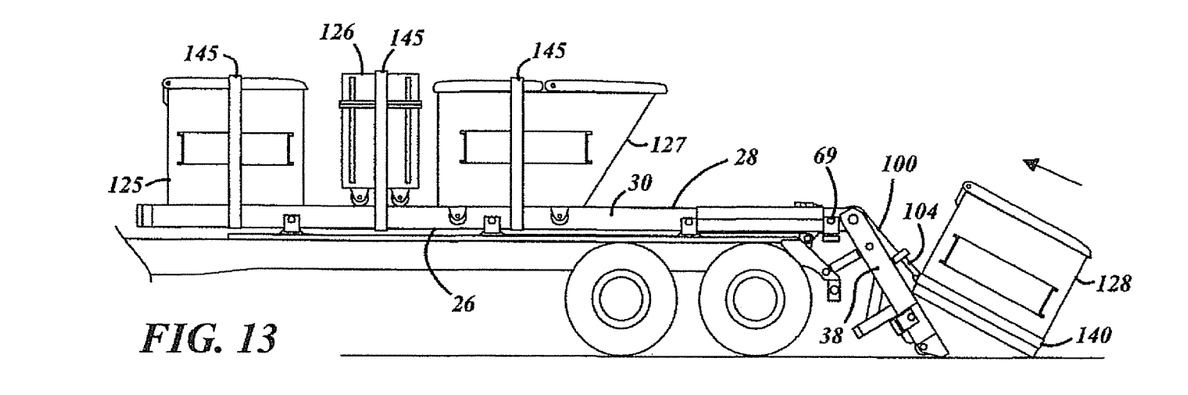
FIGS. 13-15 illustrate an alternate embodiment of the invention loading and unloading other types of containers.

Another advantage of the present invention is that it allows cable hoist type vehicles to pick up and transport many different types of containers, and also transport several smaller containers at one time. For example, as shown in FIG. 13, the hinged tail member 38 allows a vehicle to pick up front-load containers, rear-load containers, air shipment containers, sealed containers, etc. 125, 126, 127, 128, which have different sizes and structures. With the hinged tail member 38 in the lowered position, the cable hoist mechanism can be used to pull these containers up the tail member and onto the tilt frame member.

A strap, chain, or other mechanism 140 is wrapped around or otherwise securely attached to the container 128. The hook or fastener 104 attached to the end of the cable 100 is connected to the member 140 and the container is then pulled onto the tilt frame member as mentioned above. With this invention, is it not always necessary to tilt or raise the tilt frame member 28 from the vehicle frame 26, but the tilt frame member 28 can be kept in a horizontal position (as shown in FIG. 13). In a further embodiment, as mentioned above, the tilt frame member can be eliminated.

The vehicle can hold and transport a plurality of containers of this type, as shown in FIG. 13. The containers on the tilt frame can be tied down or otherwise secured to the tilt frame in any conventional manner, such as with tie-down straps 145, ropes, chains, etc.

For this purpose, only a cable hoist mechanism is provided and can be utilized. Also, the moveable carriage 34 is positioned below the plane of the top of the side rails 30, 32 of the tilt frame so that it can easily travel the length of the tilt frame without interference with the containers previously positioned thereon.

Figure 14:
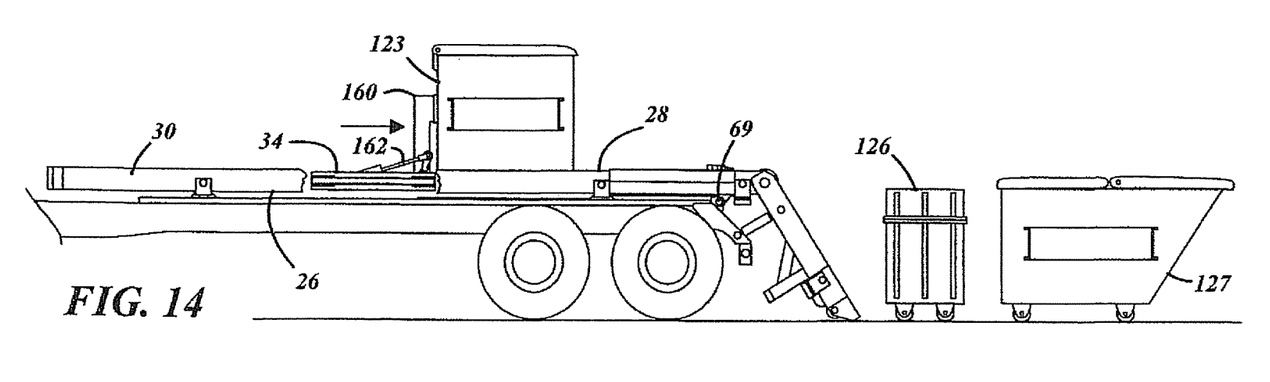
Figure 15:
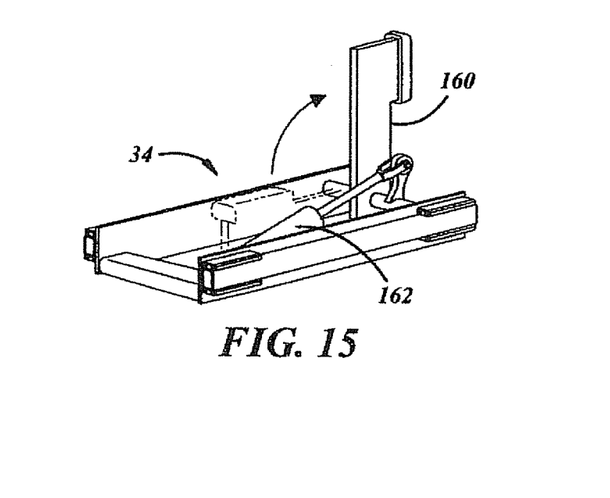

In order to unload the containers (e, g. 125-128), the carriage 34 has a moveable push member 160. The push member 160 is attached to the carriage 34 and is hydraulically or mechanically rotated when it is needed to a vertical position (as shown in FIGS. 14 and 15). A hydraulic or pneumatic cylinder mechanism 162 for moving the push member 160 to its use position is shown in FIGS. 14 and 15. Thus, when the carriage 34 is moved toward the rear end of the tilt frame member in order to unload the containers, the push member 160 contacts the containers (e.g. 125-128) one at a time and pushes them back towards the end of the vehicle. Also, the tension of the cable 100 which is attached to the containers being unloaded can be managed by movement of the carriage so the containers can be safely unloaded down the hinged rail member.

In order to protect the hydraulic cylinders, such as 36, 72 from damage due to unwanted movement of a container during loading or unloading, plate members 200 and 202 can be attached to the tilt frame 28 and hinged tail member 38, respectively. See FIG. 11 where the plate members are shown in phantom. One or both of these plate members can be utilized as desired. The plate members are preferably made of a steel sheet metal or a similar strong and durable material.

Another preferred embodiment of the invention is shown in FIG. 17. This shows use of a hinged tail member 200 on a different type of tilt frame member 202. The tilt frame member 202 is rotatably (or hingedly) attached to an underlying vehicle hoist lift frame 204. The tilt frame member 202 is rotatably hinged at pivot member 206. The tilt frame member 202 is raised and lowered relative to the vehicle frame 204 by a pair of hydraulic cylinders 208, 209 (only one of which is shown).

The tilt frame includes a pair of elongated side frame members 210 and 212 and a plurality of cross-frame members 214, 215, 216, 217 and 218. A dual cylinder reeving arrangement 230 includes a pair of hydraulic cylinders 170, 172 which are provided to operate a cable 100'. A hook member 104, or other container attachment member, is attached to the end of the cable 100'. The dual hydraulic cylinder reeving arrangement 230 is used to extend and retract the cable 100' in order to load and unload containers on and off the transport vehicle. The reeving arrangement is also explained in detail above with reference to FIG. 16.

The tail member 200 is hingedly (or rotatably) attached to the distal end of the tilt frame member 202 by pivot member 250. The tail member 200 is rotated (i.e. raised and lowered) by a pair of hydraulic cylinders 252, 254. The cylinders 252 and 254 are connected to the vehicle frame in the same or similar manner as set forth above with respect to the other embodiments of the invention.

It is also possible for the hinged tail member and tilt frame member to share a common pivot mechanism.

The tail member preferably has a square or rectangular structure formed by frame members 257, 258 and 259. If desired, hold down devices (not shown) can be provided on the hinged tail member in the same manner as discussed above with reference to FIGS. 10 and 11. In addition, protective plate member 260 can be provided to protect the cylinders 252, 254 from damage.

A pulley member 236 is provided on the pivot member 250 to assist in operation of the cable and reeving system for loading and unloading containers. Bumper 238 is also provided on the vehicle frame 204 and bumper 239 is provided on the tail member 200.

Although a dual cylinder reeving arrangement is shown in FIG. 17, alternate embodiments can use a single cylinder reeving arrangement, or other conventional cable hoisting systems.

The tilt frame member 202 and hinged tail member 200 are operated to load and unload containers in substantially the same manner as discussed above. The operation of the dual cylinder reeving arrangement 230 extends and retracts the cable 240 which in turn is used to load and unload trash containers and/or other containers onto or off from the transport vehicle. The hinged tail member is operated in a similar manner as discussed above to assist in the loading and unloading operations. The controls and control valves for operating the hydraulic systems and cylinders are positioned adjacent to the hydraulic oil tank 255.

The hinged tail member provides the same benefits and advantages to a tilt frame vehicle with a dual cylinder reeving arrangement as it does to the other lifting and hoisting embodiments discussed above.

While preferred embodiments of the present invention have been shown and described herein, numerous variations and alternative embodiments will occur to those skilled in the art. Accordingly, it is intended that the invention is not limited to the preferred embodiments described herein, but instead is limited to the terms of the appended claims.

What is claimed is:

1. A system for loading and unloading a container from a transport vehicle comprising:
    a. a tilt frame member pivotally attached to a transport vehicle, a system coupled with the tilt frame member for rotating the tilt frame member with respect to the vehicle, the tilt frame member having a length defined by a front end located adjacent to the cab of the transport vehicle and a rear end located at a distance from the cab;
    b. an engaging mechanism on the tilt frame member for releasably engaging a container and for assisting in loading and unloading containers from the tilt frame member;
    c. a first hydraulic system for moving said engaging mechanism along said tilt frame member;
    d. a tail member hingedly attached adjacent said rear end of said tilt frame member, the tail member independent of the tilt frame member toward the ground, the tail member angled toward the ground during loading or unloading of a container, therby creating an angle with respect to the tilt frame member so that the tail member is not parallel to the tilt frame member reducing a tilt frame angle with respect to the vehicle frame; and
    e. a second hydraulic system for hingedly rotating said tail member independently of rotation of the tilt frame member and relative to said tilt frame member.

2. The system as described in claim 1 wherein said engaging mechanism is a moveable carriage.

3. The system as described in claim 1 wherein said moveable carriage includes a push member.

4. The system as described in claim 2 wherein said moveable carriage includes a hook lift mechanism.

5. The system as described in claim 4 wherein said hook lift mechanism includes a telescopic jib mechanism.

6. The system as described in claim 2 wherein said moveable carriage includes a cable hoist mechanism.

7. The system as described in claim 2 wherein said moveable carriage includes both a cable, hoist mechanism and a hook lift mechanism.

8. The system as described in claim 7 wherein said hook lift mechanism includes a telescopic jib mechanism.

9. The system as described in claim 1 wherein said first hydraulic system is a single cylinder reeving arrangement.

10. The system as described in claim 9 wherein said single cylinder reeving arrangement comprises a centrally located multi-stage hydraulic cylinder.

11. The system as described in claim 1 wherein said first hydraulic system is a dual cylinder reeving arrangement.

12. The system as described in claim 1 wherein said tilt frame member includes a third hydraulic system for raising said front end of said tilt frame member relative to the vehicle.

13. The system as described in claim 1 further comprising a protective plate member positioned on said tilt frame member.

14. The system as described in claim 1 further comprising a protective plate member positioned on said tail member.

15. A system for loading and unloading containers from a transport vehicle comprising:
    an elongated tilt frame member rotatably attached to a transport vehicle, a system coupled with the tilt frame member for rotating the tilt frame member with respect to the vehicle;
    a dual cylinder reeving arrangement positioned on the tilt frame member for loading and unloading containers onto and off from a vehicle;
    a hinged tail member rotatably attached adjacent a distal end of the tilt frame member, the tail member rotatable independent of the tilt frame member toward the ground, the tail member angled toward the ground during loading or unloading of a container, thereby creating an angle with respect to the tilt frame member so that the tail member is not parallel to the tilt frame member reducing a tilt frame angle with respect to the vehicle frame; and
    wherein said tail member can be rotated independently of rotation of the tilt frame member and between a first position in alignment with said tilt frame member and a second position adjacent to the ground.

16. The system as described in claim 15 further comprising:
    a first hydraulic mechanism for rotatably tilting said tilt frame member and a second hydraulic mechanism for rotatably moving said hinged tail member between said first and second positions.

17. The system as described in claim 15 wherein said tail member is rotatably connected to said tilt frame member by a pivot member and wherein a cable pulley is positioned on said pivot member.

18. The system as described in claim 15 further comprising a protective plate member positioned on said hinged tail member.

19. The system as described in claim 15 further comprising at least one hold down member on said hinged tail member.

20. A method for loading and unloading containers onto a transport vehicle comprising:
    a. providing an elongated tilt frame member rotatably attached to a transport vehicle, a system coupled with the tilt frame member for rotating the tilt frame member with respect to the vehicle;

b. providing a tail member pivotably attached to the rear of the elongated tilt frame member by a pivot member and being actuated by at least one hydraulic cylinder;

c. rotating the tail member independent of the tilt frame system to move the tail member between a first position in alignment with said tilt frame member and a second position adjacent the ground;

d. providing a dual hydraulic cylinder reeving arrangement on said tilt frame member for connecting to containers, said reeving arrangement having a cable member;

e. actuating pivotal rotation of said tail member to said second position, wherein the tail member rotates independent of the tilt frame member toward the ground, the tail member angled toward the ground during loading or unloading of a container, thereby creating an angle with respect to the tilt frame member so that the tail member is not parallel to the tilt frame member reducing a tilt frame angle with respect to the vehicle frame;

f. connecting said cable member of said dual hydraulic cylinder reeving arrangement to a container;

g. activating said dual hydraulic cylinder reeving arrangement to assist in pulling a container up said tail member and onto said tilt frame member; and h. rotating said tail member to said first position.

* * * * *

UNITED STATES PATENT AND TRADEMARK OFFICE
CERTIFICATE OF CORRECTION

PATENT NO. : 9,446,700 B2  
APPLICATION NO. : 13/911261  
DATED : September 20, 2016  
INVENTOR(S) : Charles Duell et al.

Page 1 of 1

It is certified that error appears in the above-identified patent and that said Letters Patent is hereby corrected as shown below:

In the Specification

<u>Column 1</u>
Line 5            "APPLICATON" should be --APPLICATION--

<u>Column 12</u>
Line 9            "e,g." should be --e.g.--

In the Claims

<u>Column 13</u>
Line 53, Claim 1     "therby" should be --thereby--
Line 62, Claim 3     "claim 1" should be --claim 2--

<u>Column 14</u>
Line 4, Claim 7      "cable," should be --cable--

Signed and Sealed this
Twenty-seventh Day of June, 2017

Joseph Matal
*Performing the Functions and Duties of the
Under Secretary of Commerce for Intellectual Property and
Director of the United States Patent and Trademark Office*